(12) United States Patent
Faust

(10) Patent No.: US 7,767,762 B2
(45) Date of Patent: Aug. 3, 2010

(54) METHODS FOR FORMING COPOLYMERS COMPRISING OLEFIN AND PROTECTED OR UNPROTECTED HYDROXYSTYRENE UNITS

(75) Inventor: Rudolf Faust, Lexington, MA (US)

(73) Assignee: University of Massachusetts Lowell, Lowell, MA (US)

( * ) Notice: Subject to any disclaimer, the term of this patent is extended or adjusted under 35 U.S.C. 154(b) by 640 days.

(21) Appl. No.: 11/503,496

(22) Filed: Aug. 11, 2006

(65) Prior Publication Data

US 2007/0238840 A1 Oct. 11, 2007

Related U.S. Application Data

(63) Continuation-in-part of application No. PCT/US2005/004379, filed on Feb. 11, 2005, and a continuation-in-part of application No. 10/776,674, filed on Feb. 11, 2004, now Pat. No. 7,226,979.

(60) Provisional application No. 60/707,581, filed on Aug. 11, 2005.

(51) Int. Cl.
*C08F 293/00* (2006.01)
*C08F 8/12* (2006.01)
*C08F 4/16* (2006.01)

(52) U.S. Cl. .............. 525/245; 525/244; 525/268; 525/288; 525/299; 525/326.5; 525/328.8; 525/328.9

(58) Field of Classification Search ............. 525/245, 525/288, 299, 328.8, 328.9, 244, 268
See application file for complete search history.

(56) References Cited

U.S. PATENT DOCUMENTS 5,428,111 A * 6/1995 Faust et al. ............ 525/314
7,226,979 B2 * 6/2007 Faust et al. ............ 525/298

FOREIGN PATENT DOCUMENTS

| CA | 2040457 | * 10/1991 |
| WO | WO-95/10554 A1 | 4/1995 |
| WO | WO-2005/077995 A1 | 8/2005 |

OTHER PUBLICATIONS

Chen et al., Block copolymers of styrene and p-acetoxystyrene with polyisobutylene by combination of living carbocationic and atom transfer radical polymerizations, Macromol. Rapid Commun., 19, 585-589 (1998).*

Sipos, Laszlo et al., "Synthesis of Poly[(4-Hydroxystyrene)-b-Isobutylene-b-(4-Hydroxystyrene)] Triblock Copolymers via Living Cationic Sequential Block Copolymerization of Isobutylene with 4-(*tert*-Butyldimethylsilyloxy)Styrene," *Polymer Reprints*, vol. 45(1):1101-1102 (2004).

International Search Report for Application No. PCT/US2006/031613, dated Dec. 18, 2006.

* cited by examiner

*Primary Examiner*—Fred M Teskin
(74) *Attorney, Agent, or Firm*—McCarter & English, LLP

(57) ABSTRACT

Novel methods for forming copolymers, including block copolymers, which comprise one or more olefin units and one or more protected or unprotected hydroxystyrene units are provided.

22 Claims, No Drawings

US 7,767,762 B2

METHODS FOR FORMING COPOLYMERS COMPRISING OLEFIN AND PROTECTED OR UNPROTECTED HYDROXYSTYRENE UNITS

STATEMENT OF RELATED APPLICATIONS

This application claims priority to U.S. Provisional Application No. 60/707,581 filed Aug. 11, 2005 and is a continuation-in-part of U.S. Utility patent application Ser. No. 10/776,674, now U.S. Pat. No. 7,226,979, filed Feb. 11, 2004, as well as International Application No. PCT/US2005/004379, filed Feb. 11, 2005. The contents of these applications are incorporated herein by reference in their entireties.

FIELD OF THE INVENTION

This invention relates to methods for forming copolymers including an olefin coupled to a polymer comprising protected or unprotected hydroxystyrene units, and the copolymers formed by such methods.

BACKGROUND OF THE INVENTION

Living polymerization (i.e., polymerization proceeding in the practical absence of chain transfer to monomer and irreversible termination) is a very useful method for designing polymer structures, permitting for example, versatile synthetic routes for the preparation of a wide variety of well-defined polymer structures, such as end-functionalized polymers, star-shaped polymers and/or block copolymers and control of the molecular weight and molecular weight distribution of the polymer, as well as enabling functional groups to be positioned at desired points in the polymer chain. Since Szwarc et al. demonstrated the living nature of polystyryllithium formed from the reaction of sodium naphthalene and styrene in the 1950s, a wide variety of living polymerization schemes have been developed, including cationic, anionic, radical, ring-opening, and group transfer polymerization. One of the most useful features of living polymerizations is the ability to prepare block copolymers. Living cationic sequential block copolymerization is generally recognized as one of the simplest and most convenient methods to provide well-defined block copolymers with high structural integrity.

Linear-, star-, and arborescent-block copolymers with a rubbery polyisobutylene (PIB) center block and glassy end blocks are useful thermoplastic elastomers, exhibiting excellent properties such as thermal and oxidative stability and biocompatibility. To date a large number of these block copolymers with polystyrene, poly(p-methylstyrene), poly(p-tert-butylstyrene), poly(p-chlorostyrene), poly(p-fluorostyrene), poly(α-methylstyrene) and polyindene as end blocks have been prepared.

All of the above thermoplastic elastomers contain a hydrophobic end blocks. Some applications, however, require block copolymers where the end blocks are hydrophilic. The ability to tune the overall hydrophilicity of the block copolymer would provide a wide range of useful products.

SUMMARY OF THE INVENTION

According to an aspect of the present invention, methods of making block copolymers are provided. The methods include: (a) providing a carbocationically terminated polymer comprising one or more olefin blocks; (b) contacting under a first reaction condition the carbocationically terminated polymer with a capping species that does not homopolymerize under the first reaction condition, thereby forming an end-capped carbocationically terminated polymer; (c) altering the first reaction condition to substantially prevent polymerization of protected hydroxystyrene monomer species; and (d) contacting the end-capped carbocationically terminated polymer with protected hydroxystyrene monomer species under a second reaction condition, thereby providing a block copolymer.

In one embodiment, the first reaction condition includes a Lewis acidity provided by $TiCl_4$, and wherein the Lewis acidity is lowered in step (c) by the addition of a titanium tetraalkoxide species. In one embodiment, the second reaction condition comprises a Lewis acidity provided by $SnBr_4$. In another embodiment, the first and second reaction conditions comprise a temperature between −50° C. and −90° C.

In some embodiments, the carbocationically terminated polymer is formed under first reaction conditions from a reaction mixture that includes: (i) a solvent system, (ii) monomer species selected from isomonoolefins containing 4 to 18 carbon atoms per molecule and multiolefins containing 4 to 14 carbon atoms per molecule, (iii) an initiator selected from an organic ether, an organic ester, an organic alcohol, and an organic halide, and (iv) a Lewis acid.

In some embodiments, the methods can further include hydrolyzing at least a portion of the constitutional units in said block copolymer that correspond to said protected hydroxystyrene monomer species, thereby forming alcohol groups.

In one aspect, the present invention provides a method of making a block copolymer that includes: (a) providing a capped carbocationically terminated polymer; (b) neutralizing an initiator associated with the capped polymer; and (c) forming a block copolymer by contacting the capped polymer with a monomer in the presence of a second initiator. In some embodiments, the initiator is neutralized by altering the Lewis acidity. In some embodiments, the Lewis acidity is altered using a titanium tetraalkoxide species. In some embodiments, the initiator is $TiCl_4$. In some embodiments, the second initiator is $SnBr_4$. The monomer can be, but is not limited to protected or unprotected hydroxystyrene. The carbocationically terminated polymer can be, but is not limited to polyisobutylene.

In another aspect, the present invention provides copolymers that include: (a) a plurality of constitutional units that correspond to one or more olefin monomer species and (b) a plurality of constitutional units that correspond to one or more protected or unprotected hydroxystyrene monomer species, wherein the copolymer has at least one substantially uniform mechanical property. The olefin monomer species can be, but is not limited to isobutylene, 2-methylbutene, isoprene, 3-methyl-1-butene, 4-methyl-1-pentene and beta-pinene. In some embodiments, the olefin monomer species includes isobutylene. The protected hydroxystyrene monomer species can be, but is not limited to tert-butyl protected hydroxystyrene, benzyl protected hydroxystyrene, cyclohexyl protected hydroxystyrene, neopentyl protected hydroxystyrene, acetyl protected hydroxystyrene and tert-butyldimethylsilyl protected hydroxystyrene. In some embodiments, the substantially uniform property is hardness, recoil, collapse pressure, longitudinal flexibility, crimp profile, tensile strength, flexural strength, impact resistance, elasticity and compressibility.

In some embodiments, the copolymer is a block copolymer that includes: (a) an olefin block that comprises a plurality of constitutional units corresponding to said one or more olefin monomer species and (b) a styrenic block that comprise a plurality of constitutional units corresponding to said one or more protected or unprotected hydroxystyrene monomer species, wherein the copolymer has substantially uniform mechanical properties.

DETAILED DESCRIPTION OF THE INVENTION

Prior to further describing the invention, the following definitions are set forth of certain terms to be used herein.

As used herein the term "polymer" refers to molecules containing one or more chains, each containing multiple copies of one or more constitutional units. An example of a common polymer is polystyrene

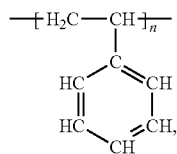

where n is an integer, typically an integer of 10 or more, more typically on the order of 10's, 100's, 1000's or even more, in which the constitutional units in the chain correspond to styrene monomers:

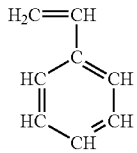

(i.e., they originate from, or have the appearance of originating from, the polymerization of styrene monomers, in this case the addition polymerization of styrene monomers).

The term "copolymer," as used herein refers to polymers that contain at least two dissimilar constitutional units. Copolymers are an important class of polymers and have numerous commercial applications. For instance, their unique properties, whether in pure form, in blends, in melts, in solutions, etc., lead to their use in a wide range of products, for example, as compatibilizers, adhesives, dispersants, and so forth. Because each copolymer has its own unique properties, there is continuing demand for novel copolymers, which can be used in products such as those above.

As used herein a polymer "block" is a grouping of 10 or more constitutional units, commonly 20 or more, 50 or more, 100 or more, 200 or more, 500 or more, or even 1000 or more units. A block can be branched or unbranched. A "chain" is a linear (unbranched) grouping of 10 or more constitutional units (i.e., a linear block). In the present invention, the constitutional units within the blocks and chains are not necessarily identical, but are related to one another by the fact that that they are formed in a common polymerization technique, e.g., a cationic polymerization technique or anionic polymerization technique.

Without wishing to be bound by any particular theory, it is believed that it may be beneficial to provide block copolymers, e.g., copolymers comprising polyolefin units and protected or unprotected hydroxystyrene units, that have substantially uniform mechanical properties. As used herein, the term "substantially uniform," refers generally, in some embodiments, to a difference of not more than a desired percentage between two areas of a polymer. A polymer with at least one "substantially uniform property" refers to a polymer in which the property, e.g., hardness does not vary more than, e.g., 20%, between two given points. In some embodiments, the term "desired percentage" is used to refer to not more than 50%, 40%, 30%, 20%, 10%, 9%, 8%, 7%, 6%, 5%, 4%, 3%, 2%, or 1%. All individual values in between those listed are meant to be encompassed by the present invention. In some embodiments, desired percentage refers to 0%. In some embodiments, "substantially uniform" refers to the property being within desired guidelines, regardless of the exact percent variation in value. For example, a specific polymer may be desired that fits into specific hardness ranges, or has a hardness greater than a specific value. In such cases, a substantially uniform hardness would have a value within the desired range. Properties include, but are not limited to, hardness, recoil, collapse pressure, longitudinal flexibility, crimp profile, e.g., low or reduced crimp profile, tensile strength, flexural strength, impact resistance, elasticity and compressibility.

Although the living homopolymerization and copolymerization of p-hydroxystyrene and p-tert-butoxystyrene has been reported with $BF_3.OEt_2$ coinitiator in the presence of a large amount of water in $MeCN/CH_2Cl_2$ solvent at 0° C., see Satoh, Kotaro; Kamigaito, Masami; and Sawamoto, Mitsuo, Department of Polymer Chemistry Graduate School of Engineering, Kyoto University, Kyoto, Japan, *Macromolecules* (2000), 33(16), 5830, this system is not applicable for the living polymerization of isobutylene. Cationic living polymerization of p-tert-butoxystyrene has also been reported in aqueous emulsion polymerization and by the $HI/ZnI_2$ initiating system in toluene or $CH_2Cl_2$. Higashimura, T.; Kojima, K.; Sawamoto, M., *Makromolekulare Chemie*, Supplement 1989, 15, 127. The $HI/ZnI_2$ initiating system, however, is inactive for the polymerization of isobutylene (IB).

Additionally, synthesis of block copolymers via sequential monomer addition typically relies, for example, on the rational selection of polymerization conditions such as Lewis acid, solvent, additives, temperature, and so forth, as well as on the selection of the appropriate order of monomer addition. For a successful living cationic sequential block copolymerization the rate of crossover to a second monomer ($R_{cr}$) should be faster than or at least equal to that of the homopolymerization of a second monomer ($R_p$). Generally, efficient crossover is achieved when the two sequential monomers have similar reactivities, or when crossover occurs from the more reactive to the less reactive monomer. On the other hand, when crossover is from the less reactive monomer to the more reactive one, a mixture of block copolymer and homopolymer is generally formed due to the unfavorable $R_{cr}/R_p$ ratio. Because the cationic reactivity of certain protected hydroxylstyrenes, for example, p-tert-butoxystyrene and p-tert-butyldimethylsilyloxystyrene, is expected to be much higher than that of olefins such as isobutylene, simple sequential monomer addition generally cannot used for the preparation of the block copolymers of the present invention.

Accordingly, in some aspects, the present invention provides a process for forming copolymers that includes: (a) providing a carbocationically terminated polymer comprising one or more olefin blocks; (b) contacting under a first reaction condition the carbocationically terminated polymer with a capping species that does not homopolymerize under the first reaction condition, thereby forming an end-capped carbocationically terminated polymer; (c) altering the first reaction condition to substantially prevent polymerization of protected hydroxystyrene monomer species; and (d) contacting the end-capped carbocationically terminated polymer with protected hydroxystyrene monomer species under a second reaction condition, thereby providing a block copolymer. For example, as discussed further below, the first reaction condition includes a Lewis acidity provided by TiCl$_4$. Additionally, the Lewis acidity can be lowered in step (c) by the addition of a titanium tetraalkoxide species. Furthermore, the second reaction conditions can include a Lewis acidity provided by SnBr$_4$. In some embodiments, the block copolymers formed by the methods of the present invention have at least one substantially uniform mechanical property. In some embodiments, the substantially uniform property is hardness, recoil, collapse pressure, longitudinal flexibility, crimp profile, e.g., low or reduced crimp profile, tensile strength, flexural strength, impact resistance, elasticity and compressibility.

Examples of olefin monomer species for use in connection with the present invention include isomonoolefins with 4 to 18 carbon atoms per molecule and multiolefins with 4 to 14 carbon atoms per molecule, for instance, isobutylene, 2-methylbutene, isoprene, 3-methyl-1-butene, 4-methyl-1-pentene, beta-pinene, and the like.

Examples of hydroxystyrene monomer species include 2-hydroxystyrene, 3-hydroxystyrene, 4-hydroxystyrene, 2,3-dihydroxystryene, 2,4-dihydroxystryene, and 3,4-dihydroxystryene species.

Examples of protected hydroxystyrene monomer species include styrene species substituted with one or more functional groups that are stable under cationic polymerization conditions, but which are hydrolysable into hydroxyl groups, for example, under the influence of acids or bases. Protected hydroxystyrene monomer species in accordance with the present invention are generally substituted with either (a) one or more R—O— groups, wherein R is a hydrocarbon group, typically containing from 1 to 12 carbons, including branched alkyl groups, cycloalkyl groups and alkylaryl groups or (b) one or more

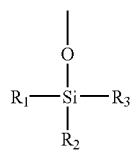

groups, where R$_1$, R$_2$, R$_3$ can be the same or different and are hydrocarbon groups, typically containing from 1 to 4 carbons, including unbranched alkyl groups, branched alkyl groups, cycloalkyl groups, and alkylaryl groups. Specific examples of protected hydroxystyrene monomers include tert-butyl protected hydroxystyrene (tert-butoxystyrene), benzyl protected hydroxystyrene (benzyloxystyrene), cyclohexyl protected hydroxystyrene (cyclohexoxystyrene), neopentyl protected hydroxystyrene (neopentoxystyrene), acetyl protected hydroxystyrene (acetoxystyrene), tert-butyldimethylsilyl protected hydroxystyrene (tert-butyldimethylsilyloxystyrene) and so forth. The protected hydroxyl groups in the styrene monomer species of the present invention can be substituted at the 2-, 3- or 4-positions, at the 2,3-, 2,4- and 3,4-positions, and so forth. Commonly, the protected hydroxyl groups in the styrene monomer species of the present invention are substituted at the 4-position.

Typically, the carbocationically terminated olefin blocks are formed at low temperature from a reaction mixture that comprises: (a) an initiator, (b) a Lewis acid coinitiator, (c) an olefin monomer, (c) an optional proton scavenger and (d) an optional solvent system.

Polymerization can be conducted, for example, within a temperature range of from about 0° C. to about −100° C., more typically from about −50° C. to −90° C. Polymerization times are typically those times that are sufficient to reach 90%, 95%, 99% or even higher conversions of the olefin monomer species to polymer.

Suitable initiators include organic ethers, organic esters, and organic halides. Initiators may be monofunctional, difunctional, trifunctional and so forth, thereby producing, for example, diblock copolymers, triblock copolymers, and radial-shaped block copolymers, respectively. Specific examples include tert-alkyl chloride, cumyl ethers, alkyl cumyl ethers, cumyl halides, cumyl esters, alkyl cumyl esters, cumyl hydroxyl compounds and hindered versions of the same, for instance, 2-chloro-2,4,4-trimethylpentane, cumyl chloride, dicumyl chloride, 5-tert-butyl,1,3-dicumyl chloride (i.e., 5-tert-butyl-1,3-bis(1-chloro-1-methylethyl)benzene), 5-tert-butyl-1,3-bis(1-methoxy-1-methylethyl)benzene, 5-tert-butyl-1,3-bis(1-acetoxy-1-methylethyl)benzene, 1,3,5-tris(1-methoxy-1-methylethyl)benzene, and 1,3,5-tris(1-acetoxy-1-methylethyl)benzene, and tricumyl chloride (i.e., 1,3,5-tris(1-chloro-1-methylethyl) benzene).

Examples of suitable Lewis acid coinitiators include metal halides and alkyl metal halides such as boron trichloride, titanium tetrachloride and alkyl aluminum halides (e.g., chlorodiethyl aluminum, dichloroethyl aluminum, chlorodimethyl aluminum, dichloromethyl aluminum). One commonly used coinitiator is titanium tetrachloride. The coinitiator is usually used in concentrations equal to or greater than that of initiator, e.g., 1 to 100 times higher, preferably 2 to 40 times higher than that of initiator.

A proton scavenger, typically a Lewis base, is frequently provided to ensure the virtual absence of protic impurities, such as water, which can lead to polymeric contaminants in the final product. Examples of proton scavengers (also referred to as proton traps) include sterically hindered pyridines, for example, substituted or unsubstituted 2,6-di-tert-butylpyridines, such as 2,6-di-tert-butylpyridine and 4-methyl-2,6-di-tert-butylpyridine, as well as 2,6-dimethylpyridine, 1,8-bis(dimethylamino)-naphthalene and diisopropylethyl amine. The proton trap is usually used at the concentration of 1 to 10 times higher than that of protic impurities in the polymerization system.

The various reactions of the present invention are typically carried out in the presence of a solvent system comprising a diluent or mixture of diluents. For the cationic polymerization and end-capping reactions, typical diluents include (a) halogenated hydrocarbons which contain from 1 to 4 carbon atoms per molecule, such as methyl chloride and methylene dichloride, (b) aliphatic hydrocarbons and cycloaliphatic hydrocarbons which contain from 5 to 8 carbon atoms per molecule, such pentane, hexane, heptane, cyclohexane and methyl cyclohexane, or (c) mixtures thereof. For example, in some embodiments, the solvent system contains a mixture of a polar solvent, such as methyl chloride, methylene chloride and the like, and a nonpolar solvent, such as hexane, cyclohexane or methylcyclohexane and the like.

Regardless of the synthesis technique, once a desired living carbocationically terminated polymer is obtained, a capping species that does not homopolymerize under the reaction conditions employed (e.g., the reaction conditions utilized in forming the carbocationically terminated polymer) is contacted with the carbocationically terminated polymer, thereby forming an end-capped carbocationically terminated polymer. Examples of capping species for this purpose include diaryl alkenes such as substituted or unsubstituted diphenyl ethylenes, for instance, diphenyl ethylene or ditolyl ethylene. Without wishing to be bound by any particular it is believed that these compounds do not polymerize due to steric hindrance; however, they do form stable carbocations with the carbocationically terminated polyolefin. In general, the diaryl alkylene species is added to the polymerization media in concentrations equal up to about 10 times the concentration of the living chain ends, preferably about 1 to about 5 times the concentration of the living chain ends, even more preferably about 2 times the concentration of the living chain ends. The diaryl alkylene species is allowed to react with the living polymer for a time sufficient to result in practically complete capping.

The resulting end-capped carbocationically terminated polymer is then contacted with a compound which alters the Lewis acidity of the solution to substantially prevent polymerization of protected hydroxystyrene monomer species.

As indicated above, when polymerizing the protected hydroxystyrene monomer species, the Lewis acidity is typically reduced relative to the reaction conditions that existed earlier (e.g., the conditions associated with the olefin polymerization and/or end-capping processes). One suitable method for reducing Lewis acidity is to add a metal alkoxide species, for example, a titanium alkoxide species or similar organotitanium species to $TiCl_4$. Typical titanium alkoxide species include $Ti(OR)_4$, wherein R is a branched or unbranched alkyl group containing 1 to 4 carbon atoms, for example, $Ti[OCH(CH_3)_2]_4$ or $Ti[O(CH_2)_3CH_3]$. The amount added generally depends on the reactivity of the protected hydroxystyrene monomer species. Suitable $TiCl_4/Ti(OR)_4$ ratios substantially prevent polymerization of protected hydroxystyrene monomer species. In some embodiments the $TiCl_4/Ti(OR)_4$ ratio is less than about 1.2. Additionally, by tuning the Lewis acidity, e.g., by adding $Ti(OR)_4$ to reach a desired $TiCl_4/Ti(OR)_4$ ratio, side reactions are minimized, and polymerization is better controlled, leading to high blocking efficiency.

The resulting end-capped carbocationically terminated polymer is then contacted with at least one protected hydroxystyrene monomer species, under conditions of suitable Lewis acidity, to produce block copolymers in accordance with the present invention. Polymerization times are those sufficient to reach the desired conversion of the protected hydroxystyrene monomer species to polymer, which is typically 80%, 90%, 95%, 99% or more.

Suitable Lewis acids for the polymerization of the protected hydroxystyrene monomer species include Lewis acids that are weaker than $TiCl_4$. Weaker Lewis acids include, but are not limited to $SnCl_4$ and $SnBr_4$. Without wishing to be bound by any particular theory, it is believed that $SnBr_4$ is well suited for the living polymerization of alkoxystyrenes.

In one aspect, the present invention provides a method of making a block copolymer that includes: (a) providing a capped carbocationically terminated polymer; (b) neutralizing an initiator associated with the capped polymer; (c) forming a block copolymer by contacting the capped polymer with a monomer in the presence of a second initiator.

The capped carbocationically terminated polymer can be, but is not limited to, a polymer formed from any of the olefin monomer species described herein. For example, the carbocationically terminated polymer can be polyisobutylene. The monomer can be, but is not limited to, any of the hydroxystyrene or protected hydroxystyrene monomer species described herein. For example, the monomer can be protected or unprotected hydroxystyrene.

The initiator can be, but is not limited to, any initiator or Lewis acid coinitiator as described herein. In some embodiments the initiator is a Lewis acid initiator, e.g., $TiCl_4$. In some embodiments, the initiator is neutralized by altering the Lewis acidity. The Lewis acidity can be altered, e.g., but the addition of a titanium tetraalkoxide species as described above. The second initiator can be, but is not limited to, an initiator or Lewis acid coinitiator as described herein, which is not the original initiator. For example, the second initiator can be, but is not limited to, Lewis acids with a weaker Lewis acidity than the original initiator. In some embodiments, the second initiator is $SnBr_4$.

In some cases, decreased variability in the structure or mechanical properties of block copolymers between batches may be desired, e.g., when scaling up to commercial or larger batches. In some embodiments, therefore, a given property is the same or substantially the same from one batch of polymer to another. Thus, in some embodiments, the present invention provides copolymers with properties that can be reliably obtained from batch to batch.

In some embodiments of the invention, at least a portion of the pendant protected hydroxyl groups within the copolymers of the present invention can be hydrolyzed, for example, with a strong acid or base, to form pendant hydroxyl groups. Hydrolysis conditions and reaction times are typically sufficient to achieve 90%, 95%, 99% or even higher conversions of the pendant hydrolysable ether groups to alcohol groups.

In embodiments of the invention where one or more hydrolysable protected hydroxystyrene monomer species are incorporated into a copolymer, at least a portion of the incorporated monomer species may be hydrolyzed, thereby forming hydroxyl groups.

A variety of block copolymers can be formed using the above techniques. For example, block copolymers of the formula $X(POL-C-PST)_n$ are formed in various embodiments, where X corresponds to the initiator species, C corresponds to the capping species, POL is an olefin block that contains a plurality of constitutional units corresponding to the one or more olefin monomer species, PST is a styrenic block that contains a plurality of constitutional units corresponding to the one or more protected or unprotected hydroxystyrene monomer species, and n is a positive whole number, e.g., a positive whole number ranging from 1 to 5. Linear block copolymers are formed where n=1 or n=2. Where n=2, the copolymers are sometimes referred to as triblock copolymers. This terminology disregards the presence of the initiator, for example, treating POL-X-POL as a single olefin block, with the triblock therefore denoted as PST-POL-PST. Star shaped copolymers are formed where n=3 or more. The value of n is typically dictated by the functionality of the initiator molecule, with monofunctional initiators corresponding to n=1, difunctional initiators corresponding to n=2, and so forth. As noted above, the olefin block(s) will contain a plurality of constitutional units that correspond to one or more olefin species, while the styrenic block(s) will contain a plurality of constitutional units that correspond to one or more protected or unprotected hydroxystyrene monomer species.

Accordingly, in some aspects of the present invention, copolymers are provided which include: (a) a plurality of constitutional units that correspond to one or more olefin monomer species and (b) a plurality of constitutional units that correspond to one or more protected or unprotected hydroxystyrene monomer species. Typically, each of these constitutional units occurs within the copolymer molecule at a frequency of at least 10 times, and more typically at least 50, 100, 500, 1000 or more times.

In some embodiments, copolymers of the present invention have at least one substantially uniform mechanical property. In some embodiments, the substantially uniform property is hardness, recoil, collapse pressure, longitudinal flexibility, crimp profile, e.g., low or reduced crimp profile, tensile strength, flexural strength, impact resistance, elasticity and compressibility.

The copolymers of the present invention embrace a variety of configurations, for example, cyclic, linear and branched configurations. Branched configurations include star-shaped configurations (e.g., radial configurations in which three or more chains emanate from a single region), comb configurations (e.g., graft copolymers having a main chain and a plurality of side chains), and dendritic configurations (e.g., arborescent or hyperbranched copolymers). The copolymers of the present invention embrace (a) one or more chains containing repeating constitutional units of a single type, (b) one or more chains containing randomly distributed constitutional units of two or more types (e.g., random or statistical copolymers), (c) one or more chains containing two or more types of constitutional units that repeat within an ongoing series (e.g., alternating copolymers), and so forth.

For example, in certain embodiments, the copolymers of the present invention are block copolymers containing (a) one or more olefin blocks, each of which contains a plurality of units corresponding to olefin monomer species, and (b) one or more styrenic blocks, each of which contains a plurality of units that correspond to protected or unprotected hydroxystyrene monomer species. Examples of olefin monomer species and protected and unprotected hydroxystyrene monomer species are discussed above.

The number average molecular weight (Mn) of the block copolymers of the present invention typically range, for example, from about 1000 to about 2,000,000, more typically from about 10,000 to about 500,000, even more typically 50,000 to 200,000, with the protected or unprotected hydroxystyrene units typically comprising 10 to 90 mol %, more typically 10 to 50 mol %, even more typically 13 to 28 mol % of the copolymer. In some embodiments, polymers have a narrow molecular weight distribution such that the ratio of weight average molecular weight to number average molecular weight (Mw/Mn) (i.e., the polydispersity index) of the polymers ranges from about 1.1 to 1.5, or even from about 1.05 to 1.3. The ratio of constitutional units corresponding to the olefin monomer species relative to the constitutional units corresponding to the protected or unprotected hydroxystyrene monomer species in the copolymer usually ranges from 1/99 to 99/1 w/w, e.g., from 30/70 to 95/5 w/w.

In still other aspects, the invention relates to an article of manufacture which includes a copolymer, e.g., a block copolymer, of the present invention.

In some embodiments, copolymers can be produced that are used in a variety of commercial applications. In some embodiments, copolymers can be produced that are capable of being hydrolyzed, thereby forming polymers of increased hydrophilicity.

The invention is further described with reference to the following non-limiting Examples.

EXAMPLES

Characterizations. Molecular weights are measured with a Waters HPLC system equipped with a model 510 HPLC pump, model 410 differential refractometer, model 441 absorbance detector, on-line multiangle laser light scattering (MALLS) detector (MiniDawn, Wyatt Technology Inc.), Model 712 sample processor, and five Ultrastyragel GPC columns connected in the following series: 500, $10^3$, $10^4$, $10^5$, and 100 Å. Tetrahydrofuran (THF) is used as a carrier solvent with a flow rate of 1 mL/min. The composition of the block copolymers are measured by $^1$H NMR spectroscopy using a Bruker 250 MHz instrument. The dn/dc values for homopolymers and block copolymers are measured on an OPTILAB DSP Interferometric Refractometer, using P10 flow cell (1 mm path length).

Materials. Methyl chloride ($CH_3Cl$) and isobutylene (Matheson) are passed through in-line gas purifier columns packed with BaO/Drierite and condensed at −80° C. prior to polymerization. Methylcyclohexane (MeChx) (Aldrich, anhydrous grade), titanium (IV) isopropoxide (Aldrich, 99.999%), titanium (IV) chloride (Aldrich, 99.9%), tetrabutylammonium fluoride (Aldrich, 1.0 M solution in tetrahydrofuran), 2,6-Di-tert-butylpyridine (Aldrich 97%), hydrochloric acid solution (36.5-38.0%, VWR), pyridine (Aldrich, anhydrous grade) and 4-dimethylaminopyridine (Aldrich, 99%) are used as received. 4-(tert-butyldimethylsilyloxy)styrene (TBDMSt) is prepared from 4-acetoxystyrene according to the literature. Hirai, A.; Yamaguchi, K.; Takenaka, K.; Suzuki, K.; Nakahama, S. *Makromol. Chem., Rapid Commun.* 1982, 3, 941. It is freshly distilled from $CaH_2$ in vacuum before the polymerization using phenothiazine (1-2 mg) inhibitor. 4-tert-butoxystyrene (Aldrich, 99%) is distilled in vacuum (p<1 mmHg, b.p. 66-68° C. over $CaH_2$). 2-Chloro-2,4,4-trimethylpentane is prepared by hydrochlorination of 2,4,4-trimethyl-1-pentene (Aldrich, 99%) with hydrogen chloride gas in dry dichloromethane at 0° C. Kaszas, G.; Gyor, M.; Kennedy, J. P.; Tüdös, F. *J. Macromol. Sci., Chem* 1983, A18, 1367-1382. The product is dried over $CaCl_2$ and distilled under reduced pressure before use. 5-tert-butyl-1,3-bis(1-chloro-1-methylethyl)benzene is synthesized following the procedure reported in Gyor, M. Wang., H. C.; Faust, R. J. *J. Macromol. Sci., Pure Appl. Chem* 1992, A29, 639. 4,4'-dimethyl-1,1-diphenylethylene (ditolyl ethylene or DTE) is synthesized according to the literature. Hadjikyriacou, S.; Faust, R., *Macromolecules* 1996, 29, 5261. Acetic anhydride is left above $P_2O_5$ overnight, poured off and left above $K_2CO_3$ overnight again, and then it is distilled at atmospheric pressure. The fraction with boiling point between 137-138° C. is collected. Methanol (technical grade) is distilled from sodium methoxide. Tetrahydrofuran (THF) is refluxed for one day above $LiAlH_4$ and distilled before use, or used as received.

Conditions. All experiments are carried out in 75 mL culture tubes under a dry nitrogen atmosphere in an Mbraun 150-M glove box (Innovative Technology Inc., Newburyport, Mass.). Reactions are conducted in a methylcyclohexane (MeChx)/methyl chloride (MeCl), 60/40 v/v, solvent mixture, at −80° C.

Example 1

Polymerization of 4-(tert-butyldimethylsilyloxy) styrene with Different [$TiCl_4$]/[$Ti(OiPr)_4$] Ratios 2-chloro-2,4,4-trimethylpentane (TMPCl) is chosen as a model compound, which mimics the end group structure of tert-chloro-ended PIB. The concentrations are as follows: [4-(tert-butyldimethylsilyloxy)styrene]=0.35 M, [TMPCl]= 0.002 M, [2,6-di-tert-butylpyridine, DTBP]=0.006 M, [1,1-ditolylethylene, DTE]=0.004 M. The reagents are added in the following order: MeChx, MeCl, TMPCl (0.5 mL, 0.05 M stock solution in MeChx), DTBP (0.5 mL, 0.15 M stock solution in MeChx), DTE (1.0 mL, 0.05 M stock solution in MeChx/MeCl, 60/40 v/v) and $TiCl_4$ (1.0 mL, 0.454 M stock solution in MeChx/MeCl=60/40). After 1 hour reaction time Ti(OiPr)$_4$ stock solution (0.125 M in MeChx/MeCl, 60/40 v/v) is added and the solution stirred thoroughly. After ~10 minutes 3.0 mL 4-(tert-butyldimethylsilyloxy)styrene monomer stock solution (1.025 g monomer in MeChx/MeCl 60/40 v/v) is added under vigorous stirring. The total volume of the reaction mixture is 12.5 mL. The polymerization is carried out for 1 hour, then it is terminated by prechilled methanol and the reaction mixture is poured into 100 mL methanol. The polymer is purified by re-precipitation from THF into methanol. As Table 1 indicates that polymerization of 4-(tert-butyldimethylsilyloxy)styrene begins to decrease with ratios of TiCl$_4$/Ti(OiPr)$_4$ below approximately 1.2.

TABLE 1

| [TiCl$_4$] | [Ti(OiPr)$_4$] | Ratio [TiCl$_4$]/ [Ti(OiPr)$_4$] | Yield (%) | M$_n$ | M$_w$/M$_n$ | I$_{eff}$ (%) |
|---|---|---|---|---|---|---|
| 0.036 | 0.009 | 4 | 100 | 142,800 | 1.80 | 28.7 |
| 0.036 | 0.018 | 2 | 100 | 128,100 | 1.60 | 32.0 |
| 0.036 | 0.0216 | 1.67 | 100 | 117,700 | 1.75 | 34.8 |
| 0.036 | 0.0252 | 1.43 | 100 | 54,000 | 1.74 | 75.9 |
| 0.036 | 0.028 | 1.28 | 98.0 | 39,100 | 1.29 | 102.8 |
| 0.036 | 0.029 | 1.24 | 32.0 | 13,800 | 1.85 | 94.9 |
| 0.036 | 0.030 | 1.20 | 8.64 | 6000 | 1.36 | 59.1 |
| 0.036 | 0.031 | 1.16 | 7.58 | 6950 | 1.48 | 44.6 |
| 0.036 | 0.032 | 1.12 | 0.8 | — | — | — |
| 0.036 | 0.033 | 1.09 | 0.1 | — | — | — |
| 0.036 | 0.036 | 1 | 0 | — | — | — |

Example 2

Synthesis of PIB-b-poly(4-tert-butyldimethylsilyloxystyrene) Diblock Copolymer

Living polyisobutylene (PIB) is first prepared with a molecular weight of ~30,000 at −80° C. in methylcyclohexane (MeChx)/methyl chloride (MeCl) 60/40 v/v solvent mixture. The reagents are applied in the following order: MeChx, MeCl, 2-chloro, 2,4,4-trimethylpentane (TMPCl) (1.0 mL, 0.05 M in MeChx), 2,6-di-tert-butylpyridine (DTBP) (1.0 mL, 0.15 M in MeChx), isobutylene (IB) (2.1 mL) and TiCl$_4$ (2.0 mL, 0.454 M in MeChx/MeCl, 60/40 v/v). IB is polymerized for 90 minutes. Then 1,1-ditolylethylene (DTE) stock solution is added (1.0 mL, 0.1 M in MeChx/MeCl, 60/40 v/v), and the mixture is left for 60 minutes. After the capping reaction, Ti(OiPr)$_4$ solution is added to reach a [TiCl$_4$]/[Ti(OiPr)$_4$] ratio of 1.2 and stirred thoroughly. It has been separately confirmed that at this ratio the polymerization of 4-tert-butoxystyrene is absent. Then 4-tert-butoxystyrene stock solution in MeChx/MeCl, 60/40, v/v solvent mixture is poured into the polymerization mixture under vigorous stirring followed by the addition of varying amounts of SnBr$_4$. The polymerization is quenched by prechilled methanol after 60 minutes, and the polymer is precipitated into methanol. The polymer is purified by repeated precipitation from THF into methanol. The characteristics of the polymers are shown in Table 2. The M$_n$s measured by GPC are virtually identical with the theoretical M$_n$s (M$_{n\ th}$) and the polydispersity index (PDI) is low.

TABLE 2

Characteristics of Block copolymers using various amounts of SnBr$_4$

| [SnBr$_4$], M | Conversion tBuSt, % | M$_{n\ th}$ | M$_{n\ GPC}$ | PDI |
|---|---|---|---|---|
| 0.01 | 72.4% | 47,200 | 47,350 | 1.11 |
| 0.02 | 93.7% | 52,800 | 52,200 | 1.14 |
| 0.036 | 97% | 53,700 | 53,170 | 1.10 |

Concentrations for the polymerization of IB: [TMPCl] = 0.002 M; [DTBP] = 0.004 M; [IB] = 1 M, [TiCl$_4$] = 0.036 M; [DTE] = 0.004 M
Solvent: MeCHx/MeCl (60/40)
Time = 90 min and T = −80° C.

Example 3

Synthesis of Poly(4-tert-butyldimethylsilyloxystyrene)-b-PIB-b-Poly(4-tert-butyldimethylsilyloxystyrene) Triblock Copolymer A difunctional living polyisobutylene (PIB) (M$_{n\ th}$=90,000, M$_{n\ GPC}$=99,000, PDI =1.2) is first prepared at −80° C. The reagents are applied in the following order: methylcyclohexane (MeChx, 154.5 mL), methyl chloride (MeCl, 103 mL), 5-tert-butyl-1,3-dicumyl methyl ether (1.0 mL, 0.05 M in MeChx), 2,6-di-tert-butylpyridine (DTBP) (4.0 mL, 0.51 M in MeChx), isobutylene (IB) (37.5 mL) and TiCl$_4$ (5.0 mL, 2.16 M in MeChx/MeCl, 60/40 v/v). IB is polymerized for 100 minutes. Then 1,1-ditolylethylene (DTE) stock solution is added (24 mL, 0.051 M in MeChx/MeCl, 60/40 v/v), and the mixture is left for 60 minutes. After the capping reaction, Ti(OiPr)$_4$ (3.8 mL neat at room temperature) is added to reach a [TiCl$_4$]/[Ti(OiPr)$_4$] ratio of 1.2 and stirred thoroughly for 60 min. Then SnBr$_4$ (19 ml, 0.072 M in MeChx/MeCl, 60/40 v/v) is added followed by the addition of 4-tert-butoxystyrene (27.3 mL neat at room temperature), which is poured into the polymerization mixture under vigorous stirring. The polymerization is quenched by prechilled methanol after 120 minutes, and the polymer is precipitated into methanol. The polymer is purified by repeated precipitation from THF into methanol. The M$_{n\ GPC}$=168,000 of the triblock copolymer measured by GPC are virtually identical with the theoretical M$_{n\ th}$=175,000 and the polydispersity index (PDI=1.2) remains low.

Prospective Example 4

Hydrolysis of PIB-b-poly(4-tert-butyldimethyl silyloxystyrene) Diblock Copolymers and poly(4-tert-butoxystyrene)-b-PIB-b-poly(4-tert-butoxystyrene) Triblock Copolymers A diblock or triblock copolymer as synthesized above will be dissolved in 50 mL THF and then approximately 2 mL HCl acid (37.0%) will be added. The solution will be refluxed for 3 hours and then cooled down and precipitated into 400 mL water which contains 1 mL ammonia solution (30%). The resulting polymer will be filtered off, washed with water, and dried in vacuum. Substantially complete hydrolysis (absence of a tert-butyl group) is expected.

Prospective Example 5

Acetylation of Copolymers 1 g copolymer from Example 4 will be dissolved in 15 mL anhydrous THF. Then, 1.42 mL (15 mmol) distilled acetic anhydride, 1.21 mL (15 mmol) pyridine and 122 mg (1 mmol) 4-dimethylaminopyridine will be added. The resulting homogenous solution will be left for one day at room temperature. The polymer solution will be poured into water (200 mL) and the precipitated polymer will be washed thoroughly with water, filtered and dried in vacuum. Substantially complete esterification is expected.

Although various embodiments are specifically illustrated and described herein, it will be appreciated that modifications and variations of the present invention are covered by the above teachings and are within the purview of the appended claims without departing from the spirit and intended scope of the invention.

I claim:

1. A method of making a block copolymer comprising:
   (a) providing a carbocationically terminated polymer comprising one or more olefin blocks;
   (b) contacting under a first reaction condition the carbocationically terminated polymer with a capping species that does not homopolymerize under the first reaction condition, thereby forming an end-capped carbocationically terminated polymer;
   (c) altering the first reaction condition to substantially prevent polymerization of protected hydroxystyrene monomer species; and
   (d) contacting the end-capped carbocationically terminated polymer with the protected hydroxystyrene monomer species and a Lewis acid that is weaker than $TiCl_4$ under a second reaction condition, thereby providing a block copolymer.

2. The method of claim 1, wherein the first reaction condition comprises a Lewis acidity provided by $TiCl_4$, and wherein the Lewis acidity is lowered in step (c) by the addition of a titanium tetraalkoxide species.

3. The method of claim 1, wherein the Lewis acid that is weaker than $TiCl_4$ is $SnBr_4$.

4. The method of claim 1, wherein the first and second reaction conditions comprise a temperature between −50° C. and −90° C.

5. The method of claim 1, wherein the carbocationically terminated polymer is formed under first reaction conditions from a reaction mixture that comprises: (i) a solvent system, (ii) monomer species selected from isomonoolefins containing 4 to 18 carbon atoms per molecule and multiolefins containing 4 to 14 carbon atoms per molecule, (iii) an initiator selected from an organic ether, an organic ester, an organic alcohol, and an organic halide, and (iv) a Lewis acid.

6. The method of claim 1, further comprising hydrolyzing at least a portion of the constitutional units in said block copolymer that correspond to said protected hydroxystyrene monomer species, thereby forming alcohol groups.

7. The method of claim 1, wherein the method provides a copolymer with at least one mechanical property that differs less than about 50% between any two points of the copolymer.

8. The method of claim 7, wherein the property is at least one property selected from hardness, recoil, collapse pressure, longitudinal flexibility, crimp profile, tensile strength, flexural strength, impact resistance, elasticity and compressibility.

9. A method of making a block copolymer comprising:
   (a) providing a capped carbocationically terminated polymer;
   (b) neutralizing an initiator associated with the capped polymer; and
   (c) forming a block copolymer by contacting the capped polymer with a monomer in the presence of a second initiator; wherein the second initiator is a Lewis acid selected from Lewis acids that are weaker than $TiCl_4$.

10. The method of claim 9, wherein the initiator is neutralized by altering the Lewis acidity.

11. The method of claim 10, wherein the Lewis acidity is altered using a titanium tetraalkoxide species.

12. The method of claim 9, wherein the initiator is $TiCl_4$.

13. The method of claim 9, wherein the second initiator is $SnBr_4$.

14. The method of claim 9, wherein the monomer is protected or unprotected hydroxystyrene.

15. The method of claim 9, wherein the carbocationically terminated polymer is a polyisobutylene.

16. A method of making a block copolymer comprising:
   (a) providing a carbocationically terminated polymer comprising one or more olefin blocks;
   (b) contacting under a first reaction condition the carbocationically terminated polymer with a capping species that does not homopolymerize under the first reaction condition, thereby forming an end-capped carbocationically terminated polymer;
   (c) altering the first reaction condition to substantially prevent polymerization of protected hydroxystyrene monomer species; and
   (d) contacting the end-capped carbocationically terminated polymer with protected hydroxystyrene monomer species under a second reaction condition, thereby providing a block copolymer;
   and further comprising hydrolyzing at least a portion of the constitutional units in said block copolymer that correspond to said protected hydroxystyrene monomer species, thereby forming alcohol groups.

17. The method of claim 16, wherein the first reaction condition comprises a Lewis acidity provided by $TiCl_4$, and wherein the Lewis acidity is lowered in step (c) by the addition of a titanium tetraalkoxide species.

18. The method of claim 16, wherein the first and second reaction conditions comprise a temperature between −50° C. and −90° C.

19. The method of claim 16, wherein the carbocationically terminated polymer is formed under first reaction conditions from a reaction mixture that comprises: (i) a solvent system, (ii) monomer species selected from isomonoolefins containing 4 to 18 carbon atoms per molecule and multiolefins containing 4 to 14 carbon atoms per molecule, (iii) an initiator selected from an organic ether, an organic ester, an organic alcohol, and an organic halide, and (iv) a Lewis acid.

20. The method of claim 16, wherein the method provides a copolymer with at least one mechanical property that differs less than about 50% between any two points of the copolymer.

21. The method of claim 20, wherein the property is at least one property selected from hardness, recoil, collapse pressure, longitudinal flexibility, crimp profile, tensile strength, flexural strength, impact resistance, elasticity and compressibility.

22. The method of claim 16, wherein the carbocationically terminated polymer is a polyisobutylene.

* * * * *